Feb. 3, 1959      A. MATERI      2,871,927
RUBBER SAFETY BELT FOR AUTOMOBILES
Filed Dec. 10, 1957
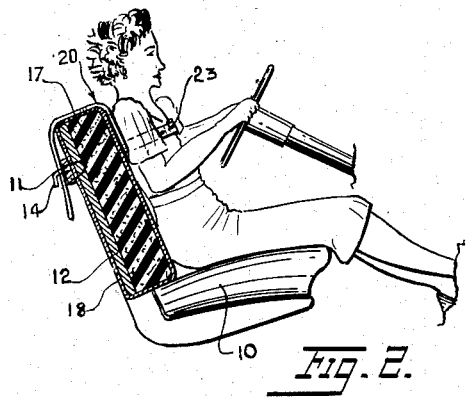
Fig. 2.
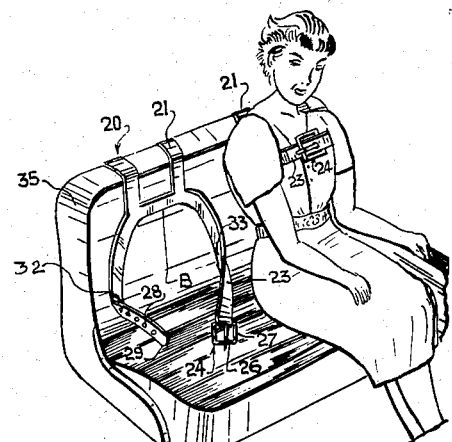
Fig. 3.
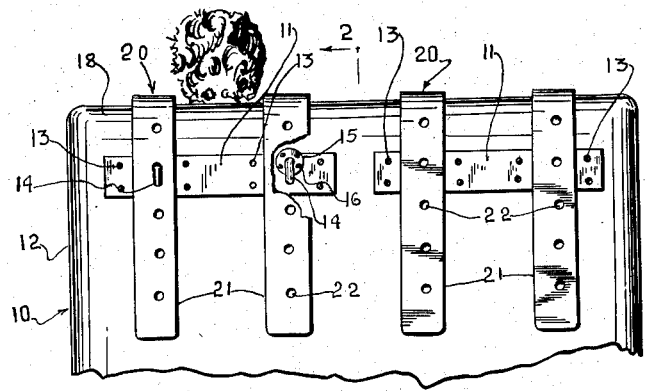
Fig. 1.
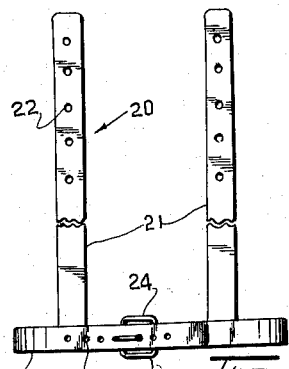
Fig. 4.
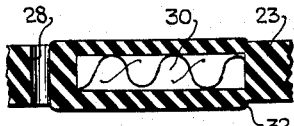
Fig. 7.
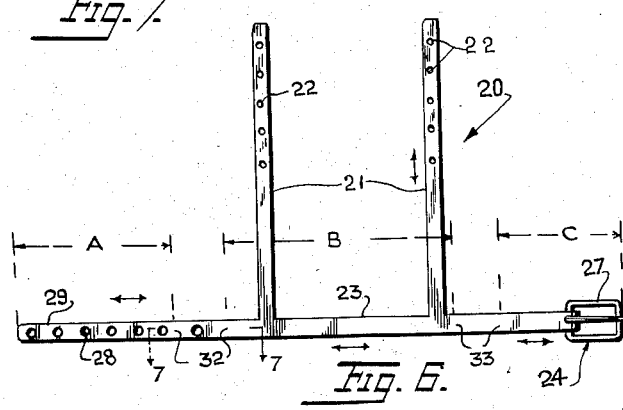
Fig. 5.
Fig. 6.
INVENTOR.
ANTONIO MATERI
BY
ATTORNEY

United States Patent Office 2,871,927
Patented Feb. 3, 1959

---

2,871,927

RUBBER SAFETY BELT FOR AUTOMOBILES

Antonio Materi, Bronx, N. Y.

Application December 10, 1957, Serial No. 701,887

1 Claim. (Cl. 155—189)

This invention relates to the art of safety belts and particularly concerns a belt or harness useful for protecting occupants of seats in automobiles, and other vehicles.

According to the invention, there is provided a one-piece rubber harness including elastic rubber straps and a rubber buckle. One strap is adapted to encircle the chest of the wearer. The buckle is integrally formed with the chest strap and itself is a flexible member. A pair of straps are joined integrally to the chest strap and are adapted to be extended over the seat of a vehicle to engage adjustably upon hooks at the rear of the seat back. The harness is so constructed that the occupant of the seat is given freedom of movement on the seat while being restrained from being thrown forwardly or laterally in the event of a sudden stop, turn or deceleration of the vehicle.

It is, therefore, a principal object of the invention to provide an elastic rubber harness for protecting occupants seated in a moving vehicle, the harness providing greater safety in use than prior belts.

It is a further object to provide a harness including an integrally formed flexible rubber buckle.

It is a further object to provide elastic straps in a safety harness which provide freedom of ordinary movement of an occupant of a seat but restrain with increasing force, extra-ordinary movements of the occupant in an emergency.

It is another object to provide a harness of simplified structure which is economical to manufacture.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Fig. 1 is a rear view of a portion of the front or driver's seat of an automobile with the harness embodying the invention applied thereto, parts being shown broken away.

Fig. 2 is a sectional view taken on lines 2—2 of Fig. 1, showing a driver wearing the harness.

Fig. 3 is a perspective view of a rear seat with a passenger wearing the harness.

Fig. 4 is a front elevational view of a part of the harness in one position thereof.

Fig. 5 is a top plan view of the harness arranged as in Fig. 4.

Fig. 6 is a plan view of the harness spread out.

Fig. 7 is an enlarged sectional view taken on lines 7—7 of Fig. 6.

In Figs. 1 and 2 there is shown the front seat 10 of an automobile provided with a pair of spaced aligned supporting plates 11 secured to the back 12 of the seat by screws 13. A pair of spaced hooks 14 carried by circular plates 15 are secured to each supporting plate by screws 16. A rubber pad or cushion 17 rests against the back 12 of the seat and the pad and seat back are protected by a fabric cover 18.

In accordance with the invention, a safety harness 20 is removably mounted on the seat for the safety of the occupant of the automobile. In Figs. 1 and 3, two such harnesses are shown applied to the seat. The harness is molded of rubber or other suitable flexible material and is a one-piece structure. The harness comprises a pair of spaced parallel straps 21, with spaced holes 22, extending radially from a strap or belt 23 midway the ends thereof. A buckle structure 24 is formed on one end of the strap 23 and includes a looped body 27 and a central prong or tongue 26 overlying the looped body. A series of spaced holes 28 is formed in the opposite end 29 of the strap 23 through which the tongue 26 can be selectively extended when the end 29 is passed through looped body 27 as shown in Figs. 4 and 5.

Inset in the body of the chest belt are two spaced inelastic cloth or leather strips 30 as clearly shown in Figs. 6 and 7. These strips divide the chest belt 23 into three elastic sections A, B and C. The boundareis of the belt 23 where the inelastic inserts terminate are indicated at 32 and 33. Integrally formed with center section B and perpendicular thereto are the straps 21. These straps are coplanar with the center section B.

In using the harness, the straps 21 are placed over the top of the back 12 of the seat and the free ends thereof removably fastened to the hooks 14 by means of the holes 22. The belt 23 is then encircled around the chest of the occupant of the seat as shown in Figs. 2 and 3 and fastened in position by means of the prongs 26 of buckles 24 and holes 28 in the end of the straps.

In Figs. 2 and 3, there is shown how the chest belt 23 encircles the chest of the wearer allowing complete freedom of movement of the arms and legs. The body of the wearer is free for performing all ordinary movements necessary for driving or for comfortable seating. The body of the wearer is only restrained in the event of extreme lateral or forward movement on the seat such as would occur in a sudden stop or side sway of the vehicle. Because of the elasticity of the belt 23 the wearer feels no binding pressure. The elasticity of the belt 23 and straps 21 provides a mild, yielding restraining force against extreme movements which increases as the body of the wearer moves further from the normal seated position. This yielding restraint up to a certain maximum limit serevs as a shock-absorbing function which is not found in prior inelastic safety belts.

The elastic buckle is important since it cannot cut into the wearer's body or injure the wearer under any riding conditions. Prior safety belt buckles have been formed as heavy rigid metal structures which are uncomfortable to wear and are dangerous to have in contact with the wearer's body.

As shown in Fig. 3, an unoccupied harness 20 hangs ready for use on the rear seat 35 with end 29 and buckle 24 disengaged. Straps 21 may easily be relocated on hooks 14 to adjust the height of the chest belt with respect to the wearer for maximum comfort. If it is not desired to use the harness, it may be spread out flat on the back of the seat behind the rider's back. In this position, it will serve as a cushioning member and an anti-friction device to limit sliding movement of the wearer's back with respect to the seat back.

The inelastic inserts have been found desirable to localize stretching of the harness to areas where the particular stresses occur. Thus, any one of sections A, B and C of strap 23 can stretch without materially affecting the other sections.

By forming the harness as a one-piece molded rubber structure it can be made economically by mass production molding machinery.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

A safety device for an occupant of a seat in a moving vehicle having a seat with a seat back extending upwardly therefrom, comprising a pair of spaced hooks secured to the rear side of said seat back, a harness having a pair of spaced parallel elastic straps, each of said straps having spaced holes selectively engaged with said hooks, said straps extending over the top of said seat back to the front thereof, an elastic chest encircling belt integrally joined to one end of said straps, said straps being perpendicular to and coplanar with said belt, and a buckle integrally formed with said belt and disposed on one end thereof, said buckle having a flexible loop and a flexible tongue integrally formed with each other, the other free end of the belt having a plurality of spaced holes therein for engaging the tongue in said other end of the belt.

References Cited in the file of this patent

UNITED STATES PATENTS

| | | |
|---|---|---|
| 1,326,716 | Dunning | Dec. 30, 1919 |
| 1,332,328 | Fisher | Mar. 2, 1920 |
| 1,684,110 | Pickles | Sept. 11, 1928 |
| 2,130,724 | Lewis | Sept. 20, 1938 |
| 2,613,865 | Rose | Oct. 14, 1952 |
| 2,725,097 | Thoreson | Nov. 29, 1955 |
| 2,819,095 | Haltmar | Jan. 7, 1958 |

FOREIGN PATENTS

| | | |
|---|---|---|
| 296,509 | Switzerland | Feb. 15, 1954 |